United States Patent [19]

Tanaka et al.

[11] Patent Number: 4,470,791
[45] Date of Patent: Sep. 11, 1984

[54] PIPE DIE FOR UNDERWATER PELLETIZER

[75] Inventors: Yoshitomo Tanaka; Yoshiki Maki; Kanzaburo Kubota, all of Hiroshima, Japan

[73] Assignee: The Japan Steel Works, Ltd., Tokyo, Japan

[21] Appl. No.: 520,281

[22] Filed: Aug. 4, 1983

[30] Foreign Application Priority Data

Aug. 4, 1982 [JP] Japan ................................ 57/135221

[51] Int. Cl.³ ............................................... B29C 3/00
[52] U.S. Cl. ....................................... 425/311; 264/142
[58] Field of Search ................. 264/142; 425/311, 464

[56] References Cited

U.S. PATENT DOCUMENTS

| | | | |
|---|---|---|---|
| 3,114,169 | 12/1963 | Palmer et al. | 425/311 |
| 3,287,764 | 11/1966 | Swickard et al. | 425/311 |
| 3,553,776 | 1/1971 | Romagano et al. | 425/311 |
| 3,605,187 | 9/1971 | Wurster et al. | 269/142 |
| 3,618,162 | 11/1971 | Scharer et al. | 425/311 |
| 3,981,959 | 9/1976 | Cuff | 264/142 |
| 4,221,753 | 9/1980 | Bradbury | 264/142 |
| 4,264,553 | 4/1981 | Loo | 264/142 |
| 4,327,050 | 4/1982 | Salmon | 264/142 |

Primary Examiner—Jay H. Woo
Assistant Examiner—Tinker R. McBrayer
Attorney, Agent, or Firm—Sughrue, Mion, Zinn, Macpeak & Seas

[57] ABSTRACT

A pipe die for an underwater pelletizer is provided in which a nozzle plate is provided on the surface of a pipe die, the nozzle plate having a hole coaxially with and of the same diameter as a pipe of the pipe die. The nozzle plate is made of a material of the same quality as the die body and is provided with a hardened layer at its cutter side surface. Replacement and repair of the nozzle plate is improved by connecting the same to said die body by bonding the whole junction plane therebetween.

2 Claims, 2 Drawing Figures

PIPE DIE FOR UNDERWATER PELLETIZER

BACKGROUND OF THE INVENTION

The present invention relates to a die for an underwater pelletizer, and particularly to a die for an underwater pelletizer in which the nozzle is constituted by a pipe, a heating jacket is provided at the outer periphery of the pipe, and a nozzle plate is provided at the tip of the nozzle.

Generally, pelletizer dies are widely used in the field of primary materials production in the synthetic macromolecular material manufacturing industry. Recently, however, the demand for the synthetic macromolecular materials shows a tendency of differentiation into two directions, one directed to high viscosity materials and the other directed to low viscosity ones. Accordingly, it has become very difficult to produce, by extrusion, pellets having a good shape, which is an important function of the die. That is, with lowered viscosity, when a synthetic macromolecular material extruded from a nozzle opening of a die is pelletized by cutting in water, each pellet leaves a tail because of its low viscosity, resulting in a deterioration in the pellet shape to thereby lower its commercial value. To cope with this situation, generally, the cutter is strongly pressed against the die surface to cut the synthetic macromolecular material extruded from the nozzle, resulting in a problem in that the cutter and the nozzle portion at the die surface are extremely worn.

To solve this problem, conventionally, a hardened layer of a material such as tungsten-carbide alloy is formed directly on the nozzle portion at the die surface by a metal spray method, or a so-called hard tip made of a sintered hard alloy is provided. In either case, the device life-time is one year at the longest due to wear and it is necessary to perform repair by reforming the hardened layer by the metal spray method in the former case or by replacing the worn sintered hard material tip by a new one in the latter case.

An ordinary pipe die is arranged, however, such that a pipe having a nozzle hole at its center is inserted into a die body, with the opposite ends of the pipe being air-tightly welded to the die body and the intermediate portion of the pipe being arranged to function as the inner tube of a heating jacket, so that in operation a vapor of 180°-280° C. is passed through the jacket portion to prevent the temperature of the synthetic macromolecular material being extruded from falling, while the hardened layer portion at the die surface is cooled by warm water at 60°-80° C. for solidifying and transporting the cut-off pellets. Further, bending stress is repeatedly imparted to the die due to the extruding force of 50-150 Kg/cm$^2$ in extruding the melted synthetic macromolecular material.

By being arranged in the manner described above and acted on by bending stress, the conventional pipe die is disadvantageous in that if the metal spray or respray is repeatedly performed with a spray temperature which may rise to 1000°-1100° C., a crack may be generated at the welded portion between the die and each of the opposite ends of the pipe to cause leakage of heating vapor. Further, a bend may be generated in the nozzle land due to its expansion and contraction due to the temperature rise and fall in the metal spraying operation. The nozzle opening may be blocked in the respray operation and when an opening is again bored, the bored portion may be offset from the intial one so that a stepped portion may be formed on the nozzle land.

Although the jacket has the object of preventing the temperature of the synthetic macromolecular material passing through the nozzle of the die from falling below the melting point of the material, that is, 120°-180° C., the die surface temperature is apt to be lowered below 100° C. because the die surface is exposed to the warm water at 60°-70° C., and at this time the temperature of the synthetic material extruded through the nozzle land is also lowered below its melting point so that the viscosity of the melted and extruded material in the nozzle land is raised. The synthetic macromolecular material is solidified in the worst case to make it impossible to cut or extrude.

To solve this problem, therefore, it has been required to suitably select the various metal materials to be successively used from the jacket portion to the die surface such that they have heat conductivities which decrease in this order. That is, the conventional die has a serious defect in that since the boundary film heat-transfer coefficient at the die surface is larger than that at the jacket portion due to the agitation caused by the cutter, if the respective heat conductivities of the various metal materials constituting the die are erroneously selected as to order, there occurs a phenomenon in that the temperature of the die surface is extremely lowered so that the moltern synthetic material is solidified in the nozzle land to make it impossible to produce well-shaped pellets of synthetic macromolecular material.

SUMMARY OF THE INVENTION

An object of the present invention is, therefore, to provide a pipe die for an underwater pelletizer, in which the defects of the conventional die are eliminated so that no cracks are generated in the welded portion between the die body and each of the opposite ends of the pipe, no bends are generated in the nozzle land, the repair or regeneration of the nozzle plate can be performed very easily and inexpensively, and the temperature of the nozzle plate surface is not largely lowered.

To attain this object, according to the present invention, the die is characterized in that the nozzle plate is constituted of a material which is the same as the die body and provided with a hardened layer at the cutter side surface, and in that the junction between the nozzle plate and the die body is formed by bonding the whole junction plane therebetween.

DETAILED DESCRIPTION OF THE PREFERRED EMBODIMENTS

Figure 1:
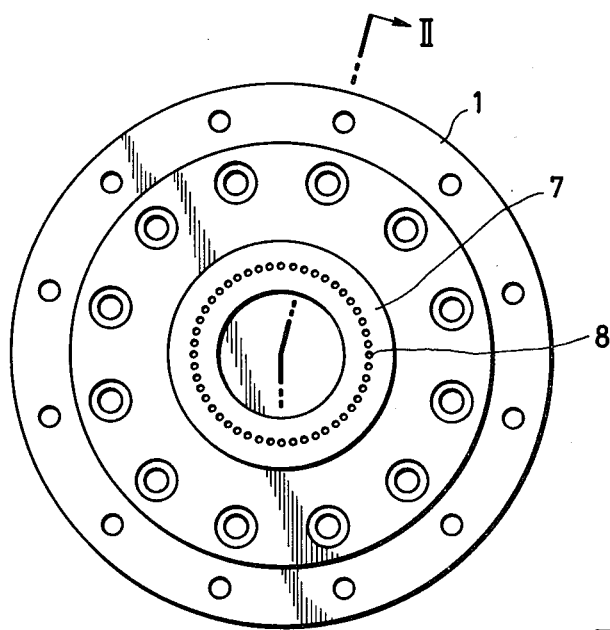
FIG. 1 is a plan view of an embodiment of the die according to the present invention.
Figure 2:
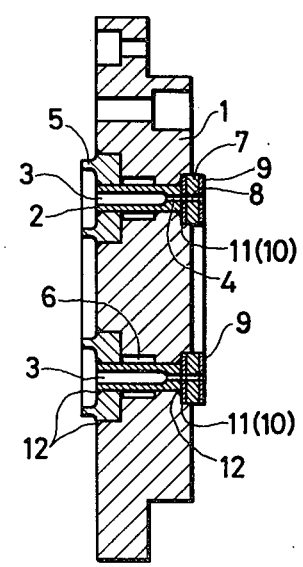
FIG. 2 is a cross-sectional view along line II—II in FIG. 1.

Referring to FIGS. 1 and 2, an embodiment of the present invention will now be described.

In the drawings, a pipe 2 inserted into a die body 1 has a forward end airtightly fixed to the die body 1 by welding, an intermediate portion formed with a nozzle hole 3 and a nozzle land 4, and a back end portion to which a jacket blocking plate 5 is airtightly fixed by welding. The jacket blocking plate 5 is also airtightly welded to the die body 1. An expanded space is formed to constitute a jacket 6 between the intermediate portion of the pipe 2 and a portion of the die body 1 corresponding to the intermediate portion of the pipe 2, and a heating vapor is led into this jacket 6.

Nozzle plate 7 is made of a material which is the same as the die body 1 and is formed with a hole 8 through which a synthetic macromolecular material can be extruded. The hole 8 is formed coaxially with the nozzle land 4 of the pipe 2 inserted in the die body 1 and has the same diameter as the nozzle land 4. The nozzle plate 7 is provided at its surface with a hardened layer 9 made of a sintered hard alloy such as a tungsten-carbide alloy provided by the metal spray method, or with a cemented carbide tip. The nozzle plate 7 is connected to the die body 1 by brazing alloy 11 provided over the whole junction plane 10. Reference numeral 12 designates a welded portion.

The thus arranged pipe die according to the present invention may be produced in the following manner: First, the die body 1 is machined to form holes into which the pipe 2 is to be inserted to form the jacket 6, and in which the jacket blocking plate 5 is to be fitted, and then the assembly of the pipe 2 and the jacket blocking plate 5 fixed to the pipe 2 by welding is fixed to the machined die body 1 by welding.

The nozzle plate 7 having a predetermined shape is produced, a hardened layer 9 is formed on the nozzle plate 7, and then the nozzle plate 7 having the hardened layer 9 is connected by brazing to the die body 1 at its predetermined position, while heating the same at 500°–900° C.

When the nozzle plate 7 is worn out and is to be replaced by a new one, the old nozzle plate 7 is heated to 500°–900° C. together with the die body 1 so as to melt the brazed junction portion to separate the nozzle plate 7 from the die body 1, and then a new nozzle plate is fixed by brazing to the die body 1.

By being arranged and produced in the manner described above, the pipe die according to the present invention is advantageous in that the die body is not at all thermally affected when the hardened layer is formed by metal spraying, and therefore there occurs no crack in the welded portion and no bend in the nozzle land. No stepped portion is generated in the nozzle plate by the boring operation after the regenerating spray operation so that the repair operation can be performed very easily, inexpensively and accurately. The nozzle plate is connected to the die body by brazing so that the connection and removal thereof can be performed very easily and inexpensively. The nozzle plate is made of a material which is the same as the die body, and the junction between the nozzle plate and the die body is formed by bonding the whole junction plane therebetween so that the heat of the jacket of the die body can be effectively transmitted to the hardened layer on the die surface through the brazing material, and therefore the temperature drop at the die surface in operation can be effectively prevented. Further, cracks due to the difference in thermal expansion rates can be prevented from occurring in the welded portion because of the homogeneity in material between the nozzle plate and the die body.

The number of possible repair operations can be remarkably improved to increase to five or more compared with 2-3 times in the prior art, because of the individual production of the die body and the nozzle as well as the ease of fixing and removing the nozzle plate.

The results of comparative examinations performed using the above-described apparatus for pelletizing using polypropylene as the synthetic macromolecular material are as follows:

(1) In the case where the nozzle plate was fixed to the die body using bolts (comparative example):
  (a) When MI>1, there occurred no plugging of the melted synthetic macromolecular material in the nozzle land.
  (b) When MI≦1, the melted synthetic macromolecular material caused plugging in the nozzle land.
(2) In the case where the nozzle plate was fixed to the die body by bonding in the manner described above according to the present invention:

There occurred no abnormal state including plugging regardless of the value of MI.

What is claimed is:

1. A pipe die construction for an underwater pelletizer, comprising; a pipe die body, a nozzle plate provided on the surface of said pipe die body, said nozzle plate having a hole coaxial with, and of the same diameter as, a pipe of said pipe die body, said nozzle plate being provided with a hardened layer at a cutter side surface thereof, said nozzle plate being joined to said die body by a brazed joint extending over the whole junction plane therebetween, said nozzle plate being formed of the same material as the pipe die body to which it is joined.

2. A pipe die construction for an underwater pelletizer according to claim 1, wherein said hardened layer comprises a sintered hard alloy.

* * * * *